United States Patent [19]

Miles

[11] 4,093,407
[45] June 6, 1978

[54] INJECTION OF ADDITIVES INTO LIQUID STREAMS

[75] Inventor: David Roy Miles, Pontypool, England

[73] Assignee: Imperial Chemical Industries Inc., London, England

[21] Appl. No.: 749,562

[22] Filed: Dec. 10, 1976

Related U.S. Application Data

[62] Division of Ser. No. 411,167, Oct. 30, 1973, Pat. No. 4,015,828.

[51] Int. Cl.² .......................... F01C 1/18; F01C 21/12; F04C 1/08; B01F 5/14
[52] U.S. Cl. ...................................... 418/15; 418/206; 366/272
[58] Field of Search .................. 418/15, 205, 206; 259/5, 6, 21, 41, 95; 417/503

[56] References Cited

U.S. PATENT DOCUMENTS

| | | | |
|---|---|---|---|
| 1,834,976 | 12/1931 | Schmidt | 418/206 |
| 1,923,268 | 8/1933 | Jensen | 418/206 |
| 3,291,060 | 12/1966 | Bottoms | 418/15 |
| 3,420,180 | 1/1969 | Behrends et al. | 418/15 |
| 3,628,893 | 12/1971 | Carpigiani | 418/15 |
| 3,764,238 | 10/1973 | Carpigiani | 418/15 |

FOREIGN PATENT DOCUMENTS

| | | | |
|---|---|---|---|
| 691,807 | 5/1953 | United Kingdom | 366/76 |
| 125,139 | 5/1959 | U.S.S.R. | 418/15 |

*Primary Examiner*—John J. Vrablik

[57] ABSTRACT

A gear pump is modified by the incorporation of a hollow rod means to permit a liquid additive to be injected into the gear pump at the point at which the gear wheels separate. At this point the pressure is at or below atmospheric pressure and, as a result, the additive can be added uniformly and independently of the pumped liquid flow and pressure.

3 Claims, 2 Drawing Figures

INJECTION OF ADDITIVES INTO LIQUID STREAMS

SUMMARY OF THE INVENTION

This is a division of application Ser. No. 411,167, filed Oct. 30, 1973, now U.S. Pat. No. 4,015,828.

The present invention relates to an improved method and apparatus for the injection of additives into liquid streams, especially viscous liquid streams, such as molten polymer streams.

It is frequently required to incorporate additives into viscous liquid streams, for example molten polymer streams, at a constant rate to yield a product having a uniform composition. Particular difficulties are encountered when it is desired to incorporate the additives into a molten polymer stream flowing between a melt-pool and a spinneret in a conventional melt extrusion apparatus, such as is used in the production of synthetic filaments.

In the past such incorporation has been carried out using injectate pumps but some suffer from a number of disadvantages. Thus, when the additive has a low viscosity (e.g. a solid substance dissolved in a low viscosity solvent) and the required pressure to inject the additive into the polymer stream is in excess of 15 psig, pumping equipment available is frequently unable to deliver the liquid at a constant rate. Also, since the pressure of the polymer in which the liquid is to be injected varies, the achievement of constant uniform throughout is not possible. In addition, mixing achieved is poor and the liquid additive appears in the polymer as blobs or striations. There is also the problem that polymer seeps back towards the injectate pumps, which results in the pump lines becoming blocked.

We have now found that a liquid additive may be fed under pressure into a liquid stream, such as a molten polymer stream, by injecting the said liquid additive into the low pressure zone on the input side of a gear pump and thereafter allowing the material to be forwarded by the action of the gear pump into the liquid stream.

Accordingly, therefore, the present invention provides a process for the incorporation of an additive into a liquid stream wherein said additive is injected into the low pressure zone existing at the point in which the gears in a gear pump separate on the input side of the said gear pump and thereafter allowing the additive to be forwarded by the action of the gear pump into the liquid stream.

By a "low pressure zone" is meant a zone in which the pressure is not greater than atmospheric pressure and is preferably below atmospheric pressure.

In processes for melt spinning polymers into filaments the meter pump frequently employed to ensure uniform flow of polymer to the spinnerets may be used for this purpose, as may also the booster pump used in the same processes. In order that the aforementioned types of gear pumps may by employed in the process of the present invention, the gear pumps require to be modified by the addition of means for feeding the liquid additive to a point adjacent the zone in which the gears in the gear pump separate on the liquid input side of the said pump. The additive should be in liquid form, that is molten or in a solution or in a stable dispersion in a liquid medium.

According to another aspect the present invention further provides a modified gear pump suitable for the process hereinbefore defined comprising a centre plate containing at least two intersecting circular openings, gear wheels rotatably mounted in said openings and each in meshing contact with an adjacent wheel, at least one of said wheels being driven, inlet and outlet openings positioned adjacent the points at which the gear wheels separate and meshing respectively and means projecting into the inlet openings to permit an additive to be injected into said openings. Desirably the latter means comprises a hollow rod having an end portion shaped to conform to the gear wheels to points at which they separate.

The process of the present invention and one form of suitably modified gear pump will now be described with reference to the accompanying drawings.

Figure 1:
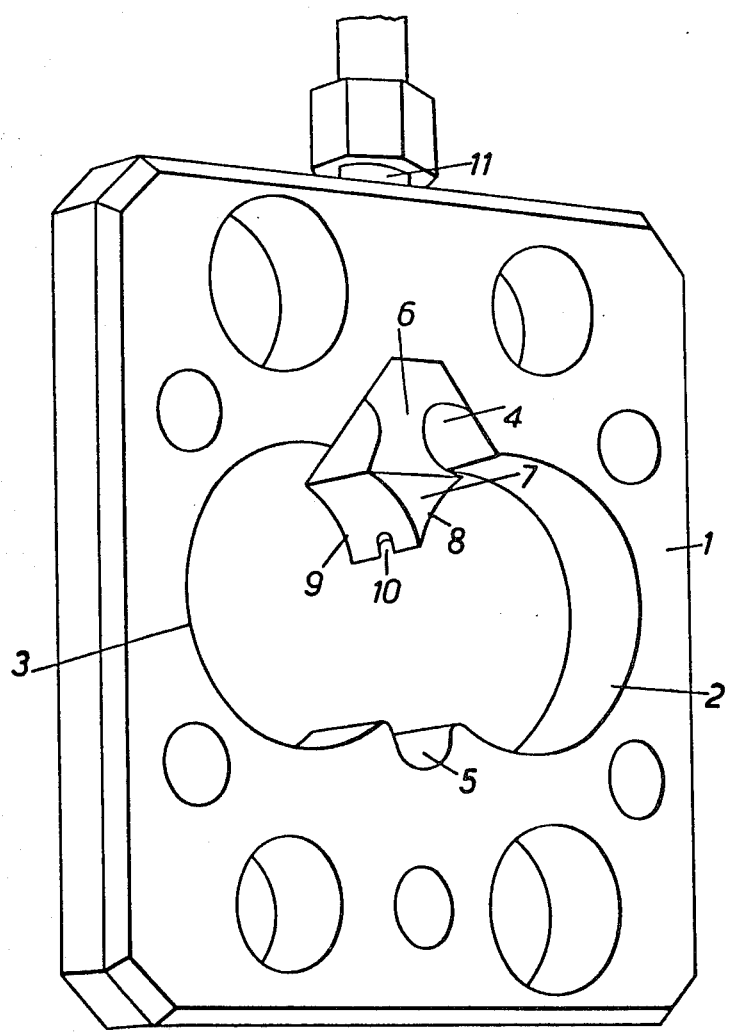
FIG. 1 is a cross-section of the centre plate of a modified gear pump.

Referring to the drawings, a centre plate 1 of a gear pump has essentially circular openings 2 and 3 to take a pair of meshing gear wheels, recessed openings 4 and 5 which connect with the inlet opening and the outlet openings respectively in the pump side plate (not shown). A hollow rod 6 having an arrow shaped head 7 passes through the centre plate at right angles to the axis of the circular openings 2 and 3; the arrow head having faces 8 and 9 shaped to conform with the gear wheels located in the spaces 2 and 3. The head 8 of the hollow rod has an opening 10 which communicates with the liquid additive feed 11. Meshing gears 12 and 13 are mounted on drive shafts 14 and 15 respectively.

Figure 2:
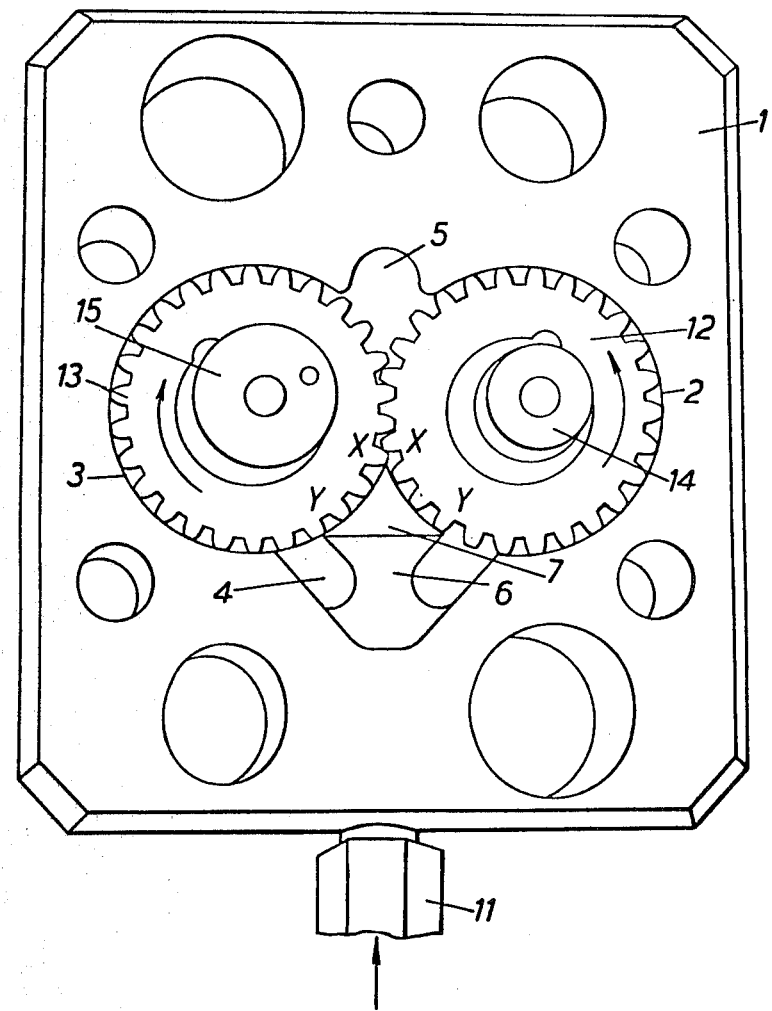
FIG. 2 is a cross-section of the centre plate of a modified gear pump showing the gears in position.

In operation the liquid additive required to be injected into the liquid stream is pumped through the hollow rod 11 out of the opening 10 to a point X on FIG. 2 where the meshing gear teeth 12 and 13 separate. At this point the liquid additive does not come into contact with the material being pumped through the gears. The additive is then carried by the gear teeth from point X to point Y where the liquid being pumped enters the gear teeth under pressure and mixed with the liquid additive. The mixture is carried out round the gear pump to the recess 5 from which it is discharged. The separation of the gear teeth at point X leads to the production of a low pressure region which is separated from the high pressure liquid feed supply by the arrow head shaped end of the hollow rod 6. The combination of close tolerances and motion of the gear teeth effectively separates the injected additive from the liquid input and prevents backflow of the said liquid input into the outlet 10 of the hollow rod.

The injection point (outlet 10) is in effective contact with the gear teeth so that the injected liquid is wiped from outlet 10 preventing intermittent build-up of the injected liquid. This, together with the mixing which occurs in the gear pump, gives improved mixing of additive and liquid stream compared with known previous methods of addition to a liquid stream. Where an even greater degree of mixing is required the mixture can be passed through, for example, a static mixing device of known design.

A further advantage of the present process is that the rate of flow of injectate is independent of the liquid flow and pressure.

The process of the present invention may be employed in the manufacture of bicomponent polyester filaments in which the components are derived from a single polymer source and have different relative viscosities. Thus a stream of molten polyester may be split into two separate streams, passed through meter pumps one of which is modified as described above. The stream passing through the modified pump has a calculated amount of ethylene glycol injected in order to reduce its viscosity to the required level. The streams were then combined in a known spinneret assembly adapted to spin bicomponent filaments.

It is clear that the process may be employed to inject a wider variety of known additives into, for example, polymer streams. Such additives include pigments, dyestuffs, antioxidants, antistatic agents, polymer modifying agents and so on provided that, where the additive is a solid it is added in the form of a solution or dispersion in a suitable liquid.

What we claim is:

1. Apparatus for incorporating an additive into a liquid stream comprising a centre plate containing at least two intersecting circular openings, gear wheels rotatably mounted in said openings and each in meshing contact with an adjacent wheel, at least one of said wheels being driven, inlet and outlet openings positioned adjacent the points at which the gear wheels separate and mesh respectively and means projecting into the inlet opening and positioned adjacent the point at which the gear wheels separate to permit an additive to be injected into said inlet opening, said means being a hollow rod having an end portion shaped to conform to the gear wheels to the point at which they separate, the inlet opening for said additive being through the tip of said end portion where the gear wheels separate.

2. Apparatus according to claim 1, wherein the gear pump is a meter pump.

3. Apparatus according to claim 1, wherein the gear pump is a booster pump.

* * * * *